June 1, 1943.  M. BALZ ET AL  2,320,552
SHOCK ABSORBER ARRANGEMENT, ESPECIALLY
FOR MOTOR VEHICLES
Filed Feb. 17, 1939
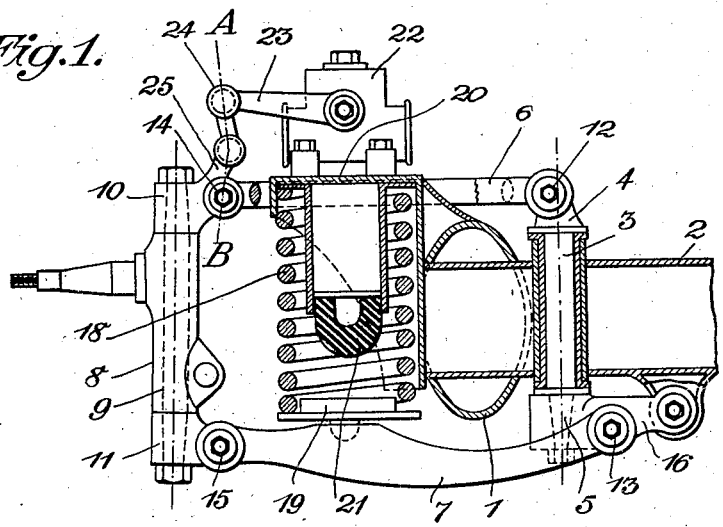
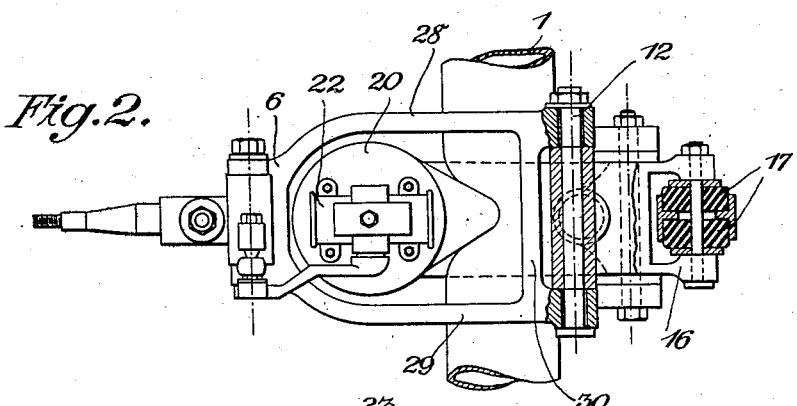
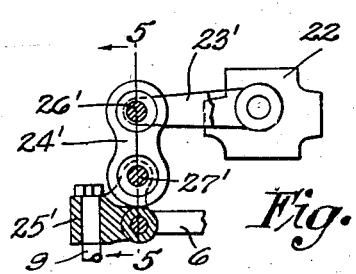
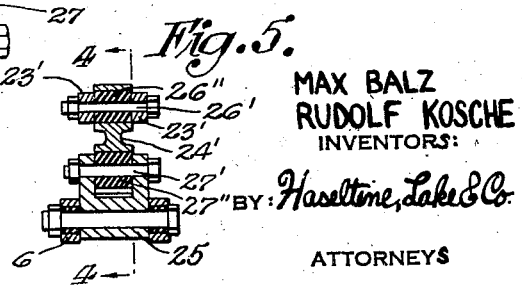
MAX BALZ
RUDOLF KOSCHE
INVENTORS
BY Haseltine, Lake & Co.
ATTORNEYS Patented June 1, 1943

2,320,552

UNITED STATES PATENT OFFICE 2,320,552

SHOCK ABSORBER ARRANGEMENT, ESPECIALLY FOR MOTOR VEHICLES

Max Balz, Esslingen-on-the-Neckar, and Rudolf Kosche, Stuttgart-Unterturkheim, Germany; vested in the Alien Property Custodian Application February 17, 1939, Serial No. 256,838
In Germany July 22, 1938

12 Claims. (Cl. 267—20)

This invention relates to a shock absorber (particularly hydraulic or friction absorber) arrangement, especially for motor vehicles, in which the wheels are guided each by guide means, especially a closed link system and cushioned by springs which are freely yieldable under transverse forces, such as preferably helical springs (or similarly arranged springs e. g. so-called ring springs (consisting of separate spring rings telecopically fitted one in the other), rubber pads, hydraulic and pneumatic cushions), which bear on the one hand against a part oscillating with the wheel preferably against the lower part of the guide means, especially the lower link and on the other hand against a spring abutment arranged on the chassis, and consists substantially in that the shock absorber is arranged on the spring abutment independently of the guide links of the wheel and actuated by a rod system connected to the wheel carrier or to one of the links preferably to the upper link.

The upper part of the guiding means, viz. the upper guiding link of the closed link system is preferably bifurcated and embraces with its arms directed towards the centre of the vehicle the spring abutment and the shock absorber arranged thereon.

Arrangements are already known in which, for cushioning the wheels guided by closed link systems, a helical spring is provided and the shock absorber is arranged on the spring abutment of the helical spring. However, in this instance the shock absorber lever serves at the same time as upper guiding link. In this arrangement, therefore, the shock absorber is stressed by the forces transmitted from the wheel to the chassis by the upper guiding link. Moreover, such an arrangement cannot be used to advantage everywhere as the mounting of the shock absorber in the joint on the joint axle of the upper link requires a considerable amount of space at this point which is not always available or results in that the upper guide link is mounted relatively far out, and therefore must be kept very short, which may possibly be very disadvantageous for the guiding of the wheel. As compared herewith the upper guide link can, owing to the invention, be made sufficiently long without requiring considerable space for the reason, that it is located more towards the middle of the vehicle. On the other hand, the shock absorber according to the invention is not loaded by the guiding forces of the wheel. At the same time the spring abutment serving for supporting the helical spring is utilized in an advantageous manner for the arrangement of the shock absorber; as the shock absorber, seen in plan view, need not project beyond the spring abutment, it does not additionally hinder the swinging movement of the guide link embracing the spring abutment within the arms of its bifurcated end.

A particular advantage is also derived from the arrangement for such closed link systems or link guides which are yieldably mounted on the chassis, as, owing to the arrangement of the shock absorber independently of the link guiding, the shock absorber need not participate in the movements which may be caused by the yieldability of the link or of the closed link system, with the result that the construction is simplified.

The shock absorber arranged on the spring abutment, independently of the closed link system, is in this instance preferably actuated by a link system whose links are constructed with a joint movable in all directions, such as ball joints or rubber joints.

An embodiment of the invention is illustrated by way of example in the accompanying drawing, in which:

Fig. 1 shows in side elevation, partly in section, a wheel suspension with shock absorber arrangement, Fig. 2 is a top plan view of Fig. 1, partly in horizontal section, Fig. 3 is a section on line A—B of Fig. 1.

Fig. 4 illustrates a modification partly in section as taken on line 4—4 in Fig. 5, while Fig. 5 is a section of the same device taken on line 5—5 in Fig. 4.

A tubular chassis cross-member 2 extends through a longitudinal chassis member 1 for example of oval cross-section, and is welded thereto to form a rigid unit.

A vertical pivot pin 3 is mounted in the chassis cross member 2 on the inner side of the longitudinal chassis member 1 and carries on its upper end a hinge piece 4 and on its lower end a hinge piece 5. The hinge pieces 4 and 5 serve for mounting an upper link 6 and a lower link 7 respectively, which links guide a wheel carrier 8 and are connected therewith or with a pivot pin 9 by hinge pieces 10 and 11 respectively. The closed link system effecting the guiding of the wheel is consequently formed by the two inner joints 12, 13 and the two outer joints 14 and 15. The pivot pin 3 rigidly connected to the hinge pieces 4 and 5 also has an inwardly directed bifurcated arm 16 which is supported in known manner by rubber pads 17 mounted on the chassis, so that the whole link system can yield about the pivot pin 3 to a limited extent determined by the resiliency of the rubber pads 17. The wheel is cushioned by a helical spring 18 guided without friction and which bears at its lower end against an abutment 19 oscillatable in all directions on the lower link 7 and at its upper end against a rigid spring abutment 20 which is rigidly welded to the end of the cross member or to the longitudinal chassis member. A rubber pad 21 arranged concentrally with the helical spring serves for limiting the vertical movement of the wheel.

A hydraulic or friction shock absorber 22 is fixed on the upper side of the spring abutment 20 and actuated by a lever 23. This lever is connected to an arm 25 on the hinge piece 10, the link 24 being connected to the lever 23 and to the hinge piece 25 by ball joints 26 and 27 respectively. As can be seen, not only the helical spring 18 with the spring abutment 20 is arranged within the closed link system 12, 14, 15, 13 but the longitudinal chassis member 1 also extends through the system in longitudinal direction so that this longitudinal chassis member may be arranged relatively far out whereas the guide links are of sufficient length to reliably guide the wheel. The upper guide link 6, as shown in Fig. 2, is bifurcated in such a manner that the spring abutment 20 and the shock absorber 22 arranged thereon are between the arms 28 and 29 of the link 6. For stiffening the link a cross stay 30 is provided between the pivot pin 12 and the spring abutment 20.

It is apparent that, by arranging the shock absorber in this manner, the oscillating movements of the link 6 are not impeded because the shock absorber 22, seen in plan view, does not project beyond the spring abutment, whereas in the event of the link system yielding in horizontal direction about the pivot pin 3, the ball joints 26 and 27 ensure lateral freedom of movement between the wheel carrier and the shock absorber.

The same principles hold also in Fig. 4 which shows a somewhat different form of embodiment of the actuation of the shock absorber in section along the line 4—4 of Fig. 5, while Fig. 5 shows a section as already indicated, following the line 5—5 of Fig. 4.

In the embodiment shown in Figs. 4 and 5, the lever 23' for actuating the shock absorber 22 is bifurcated, the ends of the fork being joined by means of a bolt 26'. The bolt 26' is passed through an opening of the link 24', a rubber bumper 26'' being interposed between the bolt 26' and the bore of the link 24', which bumper admits of elastic play in all directions between the lever 23' and the link 24'. In consequence of the interposition of the rubber bumper 26'' or 27'' the link quadrilateral serving the purpose of guiding the whel is capable of executing oscillating movements in a horizontal plane within the limits of the yielding capacity of the rubber buffers 17 without the shock absorber having to take part in this movement. It may be noted that the bolt 27' which is parallel to bolt 26' serves to connect link 24' wtih the bifurcated link member 25', the line 24' being maintained in a substantially upright position.

Having now particularly described and ascertained the nature of our said invention and in what manner the same is to be performed we declare that what we claim is:

1. A shock absorber arrangement for motor vehicles in which the whels are guided by a closed link system and cushioned by helical springs which bear on the one hand against the lower link and on the other hand against a spring abutment arranged on the chassis, comprising an arrangement of the shock absorber on the spring abutment independently of the guide links of the wheel and being actuated by a rod system which is connected to one of the links, the links forming the closed link system being mounted on a vertical pivot pin yieldably mounted on a cross chassis member in such a manner that the longitudinal chassis member and also the spring abutment serving as support for the helical spring and as fixation for the shock absorber and rigidly connected to the chassis member extend through the closed link system, the upper guide link being connected to a link pin by means of a hinge piece to which the rod system actuating the shock absorber is also hingedly connected at the same time.

2. Shock absorber arrangement for automobiles, comprising a chassis including longitudinal and cross members, spaced link quadrilaterals for guiding the wheels, bearing means for bearing the links of each quadrilateral the side of said longitudinal members toward the middle of the vehicle in such manner that the link quadrilateral can yield with respect to the chassis about a substantially vertical axis, a spring abutment on the chassis outside said longitudinal members, a spring arranged outside each longitudinal member of the chassis and bearing above against said spring abutment and below against the lower link, a shock absorber arranged on the spring abutment independently of said bearing means for the guiding links, and a rod system for actuating the shock absorber and connecting said shock absorber to the link quadrilateral in such a manner that the rod system can yield in all directions with respect to the link quadrilateral.

3. A shock absorber arrangement for motor vehicles in which the wheels are guided by a closed link system and cushioned by helical springs which bear on the one hand against the lower link and on the other hand against a spring abutment arranged on the chassis, comprising an arrangement of the shock absorber on the spring abutment independently of the guide links of the wheel and being actuated by a rod system which is connected to one of the links, the links forming the closed link system being mounted on a vertical pivot pin yieldably mounted on a cross chassis member in such a manner that the longitudinal chassis member and also the spring abutment serving as support for the helical spring and as fixation for the shock absorber and rigidly connected to the chassis member extend through the closed link system.

4. In a vehicle, a chassis, a wheel, a wheel carrier, an upper and a lower guiding link forming together with the wheel carrier and the chassis a link quadrilateral for guiding the wheel, said chassis including along one side a longitudinal frame member in combination with a substantially vertical pivot serving as bearing means for supporting the guiding links on the chassis, the guiding links being mounted on said chassis at the side of said frame member located toward the middle of the vehicle, a spring for springing the wheel with respect to the frame, said spring being substantially arranged in a vertical direction within the link quadrilateral, a spring abutment for the upper end of said spring rigidly connected to the frame member, the upper guiding link being bifurcated and embracing said spring abutment, a shock absorber arranged independently from said bearing means for the upper guiding link on said spring abutment, the frame member and the spring abutment being also arranged within the link quadrilateral, and means connecting the shock absorber to said link quadrilateral for actuating the shock absorber.

5. In a vehicle, a chassis, a wheel, a wheel carrier, an upper and a lower guiding link forming together with the wheel carrier and the chassis a link quadrilateral for guiding the wheel, said chassis including along one side a longitudinal frame member in combination with a substantially vertical pivot serving as bearing means for supporting the guiding links on the chassis, the guiding links being mounted on said chassis at the side of said frame member located toward the middle of the vehicle, a spring for springing the wheel with respect to the frame, said spring being substantially arranged in a vertical direction within the link quadrilateral, a spring abutment for the upper end of said spring rigidly connected to the frame member, a shock absorber arranged independently from said bearing means for the upper guiding link on said spring abutment, the frame member and the spring abutment being also arranged within the link quadrilateral, and means connecting the shock absorber to said link quadrilateral for actuating the shock absorber.

6. A shock absorber arrangement for an automobile or other vehicle, comprising a chassis including a cross member and along one side a longitudinal member, a link quadrilateral for guiding a wheel and having a wheel carrier, bearing means for bearing the guiding links of said link quadrilateral at the inner side of said longitudinal member adjacent to the middle of the vehicle, a spring abutment disposed on said vehicle outside said longitudinal member and opposite said bearing means, a helical spring also arranged outside the longitudinal member and bearing above against said spring abutment and below against the lower guide link, a shock absorber arranged on the spring abutment independently of said bearing means for the guiding links, and a rod system connecting said shock absorber to the link quadrilateral for actuating said shock absorber, the upper guide link of said link quadrilateral being bifurcated and embracing the spring abutment and also said shock absorber.

7. A shock absorber arrangement for an automobile or other vehicle, comprising a chassis including a cross member and along one side a longitudinal member, a link quadrilateral for guiding a wheel, and having a wheel carrier, bearing means for bearing the guiding links of said link quadrilateral at the inner side of said longitudinal member adjacent to the middle of the vehicle in such manner and position that the link quadrilateral can yield with respect to the chassis about a substantially vertical axis, a spring abutment disposed on said vehicle outside said longitudinal member and opposite said bearing means, a spring also arranged outside the longitudinal member and bearing above against said spring abutment and below against the lower guide link, a shock absorber arranged on the spring abutment independently of said bearing means for the guiding links, the upper guide link of said link quadrilateral being bifurcated and embracing the spring abutment and also said shock absorber and a rod system connecting said shock absorber to the link quadrilateral for actuating said shock absorber.

8. A shock absorber arrangement for an automobile or other vehicle, comprising a chassis including a cross member and along one side a longitudinal member, a link quadrilateral for guiding a wheel, and having a wheel carrier, bearing means for bearing the guiding links of said link quadrilateral at the inner side of said longitudinal member adjacent to the middle of the vehicle, a spring abutment disposed on said vehicle outside said longitudinal member and opposite said bearing means, a helical spring also arranged outside the longitudinal member and bearing above against said spring abutment and below against the lower guide link, a shock absorber arranged on the spring abutment, a hinge member connecting the upper guiding link to said wheel carrier, and a rod system linked to said hinge member and connecting the shock absorber with said link quadrilateral for actuating said shock absorber.

9. A shock absorber arrangement for a motor vehicle in which a wheel is guided by a closed link system including guide links and cushioned by helical springs which bear on the one hand against the lower guide link of said system and on the other hand against a spring abutment arranged on the chassis, there being bearing means for the guide links, comprising an arrangement of the shock absorber on the spring abutment independently of the bearing means of said guide links of the wheel and a rod system which is connected to one of the links serving to actuate said shock absorber, the upper guide link of the closed link system being bifurcated and the spring abutment and the shock absorber arranged thereon being located between the arms of the bifurcation, and the lower guide link serving for the bearing of the spring, and the guide links furthermore having a cross stay between their bearing points on the chassis located towards the middle of the vehicle and the spring abutment for stiffening said guide links.

10. In a vehicle, a chassis, a wheel, a wheel carrier, an upper and a lower guiding link forming together with the wheel carrier and the chassis a link quadrilateral for guiding the wheel, said chassis including along one side a longitudinal frame member in combination with means for supporting the guiding links on the chassis in condition to yield with respect to said chassis about a substantially vertical axis, the guiding links being mounted on said chassis at the side of said frame member located toward the middle of the vehicle, a spring for springing the wheel with respect to the frame, said spring being substantially arranged in a vertical direction within the link quadrilateral, a spring abutment for the upper end of said spring rigidly connected to the frame member, a shock absorber arranged independently from said bearing means for the upper guiding link on said spring abutment, the frame member and the spring abutment being also arranged within the link quadrilateral, and means connecting the shock absorber to said link quadrilateral for actuating the shock absorber.

11. In a vehicle, a chassis, a wheel, a wheel carrier, an upper and a lower guiding link forming together with the wheel carrier and the chassis a link quadrilateral for guiding the wheel, said chassis including along one side a longitudinal frame member in combination with a bearing element for supporting the two guiding links on the chassis, said bearing element being mounted on said chassis, the guiding links being mounted on said chassis at the side of said frame member located toward the middle of the vehicle, a spring for springing the wheel with respect to the frame, said spring being substantially arranged in a vertical direction within the link quadrilateral, a spring abutment for the upper end of said spring rigidly connected to the frame member, a shock absorber arranged independently from said bearing means for the upper guiding link on said spring abutment, the frame member and the spring abutment being also arranged within the link quadrilateral, and means connecting the shock absorber to said link quadrilateral for actuating the shock absorber.

12. Shock absorber arrangement for an automobile or other vehicle, comprising a chassis including along one side a longitudinal member and also at least one cross member, a link quadrilateral for guiding a wheel, on said chassis, a substantially vertical pivot for bearing the guide links of the link quadrilateral on the same chassis, said pivot being yieldingly supported on said cross member, bearing means for bearing the links of said link quadrilateral at the inner side of said longitudinal member toward the middle of the vehicle in such manner that the link quadrilateral can yield with respect to the chassis about a substantially vertical axis, a spring abutment on the chassis outside said longitudinal member, a spring also arranged outside said longitudinal member of the chassis and bearing above against said spring abutment and below against the lower link of the link quadrilateral, a shock absorber arranged on the spring abutment independently of said bearing means for the guiding links, and a rod system for actuating the shock absorber and connecting said shock absorber to the link quadrilateral in such manner that the rod system can yield in all directions with respect to the link quadrilateral.

MAX BALZ.
RUDOLF KOSCHE.